(12) United States Patent
Timmons et al.

(10) Patent No.: US 9,174,283 B2
(45) Date of Patent: Nov. 3, 2015

(54) MAGNETIC DRILL PRESS

(71) Applicant: Milwaukee Electric Tool Corporation, Brookfield, WI (US)

(72) Inventors: Terry L. Timmons, Milwaukee, WI (US); Andrew M. Plowman, Wauwatosa, WI (US); James Wekwert, Milwaukee, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 14/256,615

(22) Filed: Apr. 18, 2014

(65) Prior Publication Data

US 2014/0227054 A1 Aug. 14, 2014

Related U.S. Application Data

(63) Continuation-in-part of application No. 13/837,429, filed on Mar. 15, 2013.

(60) Provisional application No. 61/813,813, filed on Apr. 19, 2013, provisional application No. 61/638,158, filed on Apr. 25, 2012.

(51) Int. Cl.
  *B23B 45/14* (2006.01)
  *B23B 47/26* (2006.01)
  (Continued)

(52) U.S. Cl.
  CPC ............ *B23B 47/26* (2013.01); *B23Q 17/2404* (2013.01); *B25H 1/0071* (2013.01);
  (Continued)

(58) Field of Classification Search
  CPC ...... B23Q 5/32; B23H 1/0071; B23H 1/0064; B23H 1/0057; B23H 1/0021

USPC ............ 408/5–12, 13, 16, 76, 132, 135, 136; 192/223.1

See application file for complete search history.

(56) References Cited

U.S. PATENT DOCUMENTS 1,388,875 A * 8/1921 Mirrielees ...................... 408/134
2,873,832 A * 2/1959 Helm .......................... 192/223.1
(Continued)

FOREIGN PATENT DOCUMENTS

GB 2169226 A * 7/1986
JP 2002-254227 9/2002
(Continued)

OTHER PUBLICATIONS

Milwaukee, "Service Parts List" Bulletin No. 54-46-0400, 2011, 4 pages.
(Continued)

*Primary Examiner* — Daniel Howell
*Assistant Examiner* — Yasir Diab
(74) *Attorney, Agent, or Firm* — Michael Best & Friedrich LLP

(57) ABSTRACT

A magnetic drill press includes a main housing, a base coupled to the main housing and including a magnet for selectively magnetically latching to a ferromagnetic workpiece. The magnetic drill press further includes a drill unit supported by the main housing for relative movement therewith in a direction of a rotational axis of the drill unit, a spindle assembly operable to selectively position the drill unit relative to the main housing, and a handle assembly. The handle assembly is removably coupled to the spindle assembly without the use of tools, for driving the spindle assembly.

20 Claims, 14 Drawing Sheets

(51) Int. Cl.
  *B25H 1/00* (2006.01)
  *B23Q 17/24* (2006.01)
(52) U.S. Cl.
  CPC ........... *B25H1/0092* (2013.01); *Y10T 408/554* (2015.01); *Y10T 408/6779* (2015.01); *Y10T 408/6786* (2015.01)

(56) References Cited

U.S. PATENT DOCUMENTS

| | | | |
|---|---|---|---|
| 3,500,707 A * | 3/1970 | Warren | ........................ 408/135 |
| 4,012,162 A | 3/1977 | Warren | |
| 4,591,301 A | 5/1986 | Pelfrey | |
| 5,096,340 A | 3/1992 | Forsgren | |
| 6,443,675 B1 | 9/2002 | Kopras et al. | |
| 6,754,935 B2 | 6/2004 | Pozgay et al. | |
| 2005/0175423 A1 * | 8/2005 | Ku et al. | ........................ 408/136 |
| 2006/0104731 A1 | 5/2006 | Etter et al. | |
| 2009/0028653 A1 | 1/2009 | Wilbert et al. | |
| 2009/0196696 A1 | 8/2009 | Otsuka et al. | |
| 2009/0260466 A1 * | 10/2009 | Nakamura | ...................... 74/332 |

FOREIGN PATENT DOCUMENTS

| | | |
|---|---|---|
| JP | 2004-009149 | 1/2004 |
| WO | 2013/163412 | 10/2013 |

OTHER PUBLICATIONS

International Search Report and Written Opinion for Application No. PCT/US2014/034674 dated Aug. 29, 2014 (11 pages).

* cited by examiner

MAGNETIC DRILL PRESS

CROSS-REFERENCE TO RELATED APPLICATIONS

This application is a continuation-in-part of co-pending U.S. patent application Ser. No. 13/837,429 filed on Mar. 15, 2013, which claims priority to U.S. Provisional Patent Application No. 61/638,158 filed on Apr. 25, 2012, the entire contents of all of which are incorporated herein by reference.

This application also claims priority to U.S. Provisional Patent Application No. 61/813,813 filed on Apr. 19, 2013, the entire content of which is incorporated herein by reference.

FIELD OF THE INVENTION

The present invention generally relates to power tools and, more specifically, to magnetic-base drill presses.

BACKGROUND OF THE INVENTION

Magnetic-base drill presses perform drilling operations by attaching a magnetic base of the drill press to a ferromagnetic workpiece. Such magnetic bases may be switchable between magnetized and demagnetized states using electromagnets or permanent magnets.

SUMMARY OF THE INVENTION

The invention provides, in one aspect, a magnetic drill press including a main housing; a base coupled to the main housing and including a magnet for selectively magnetically latching to a ferromagnetic workpiece. The magnetic drill further includes a drill unit supported by the main housing for relative movement therewith in a direction of a rotational axis of the drill unit, a spindle assembly operable to selectively position the drill unit relative to the main housing, and a handle assembly. The handle assembly is removably coupled to the spindle assembly without the use of tools, for driving the spindle assembly.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
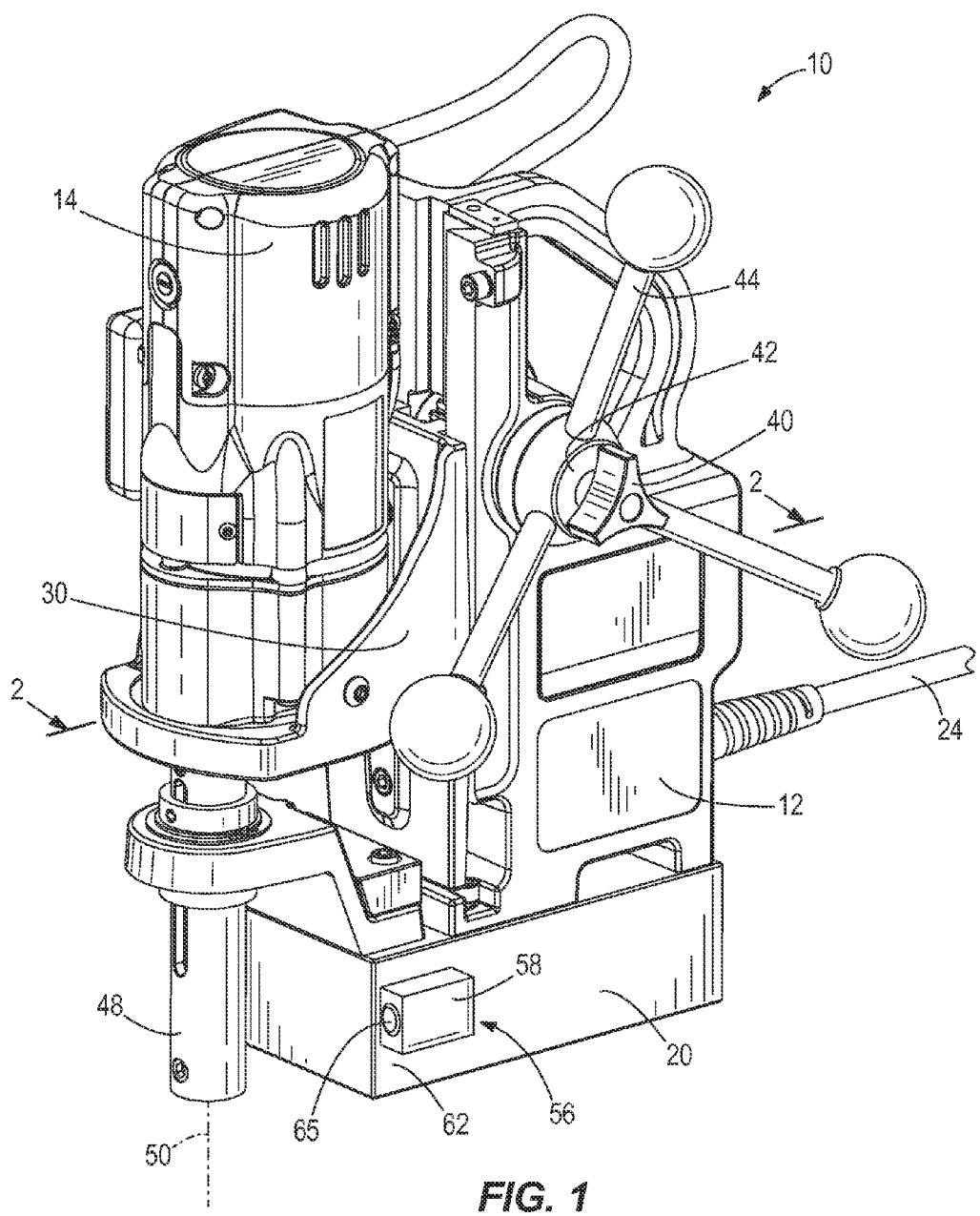
FIG. 1 is a perspective view of a magnetic drill press according to one embodiment of the invention.
Figure 2:
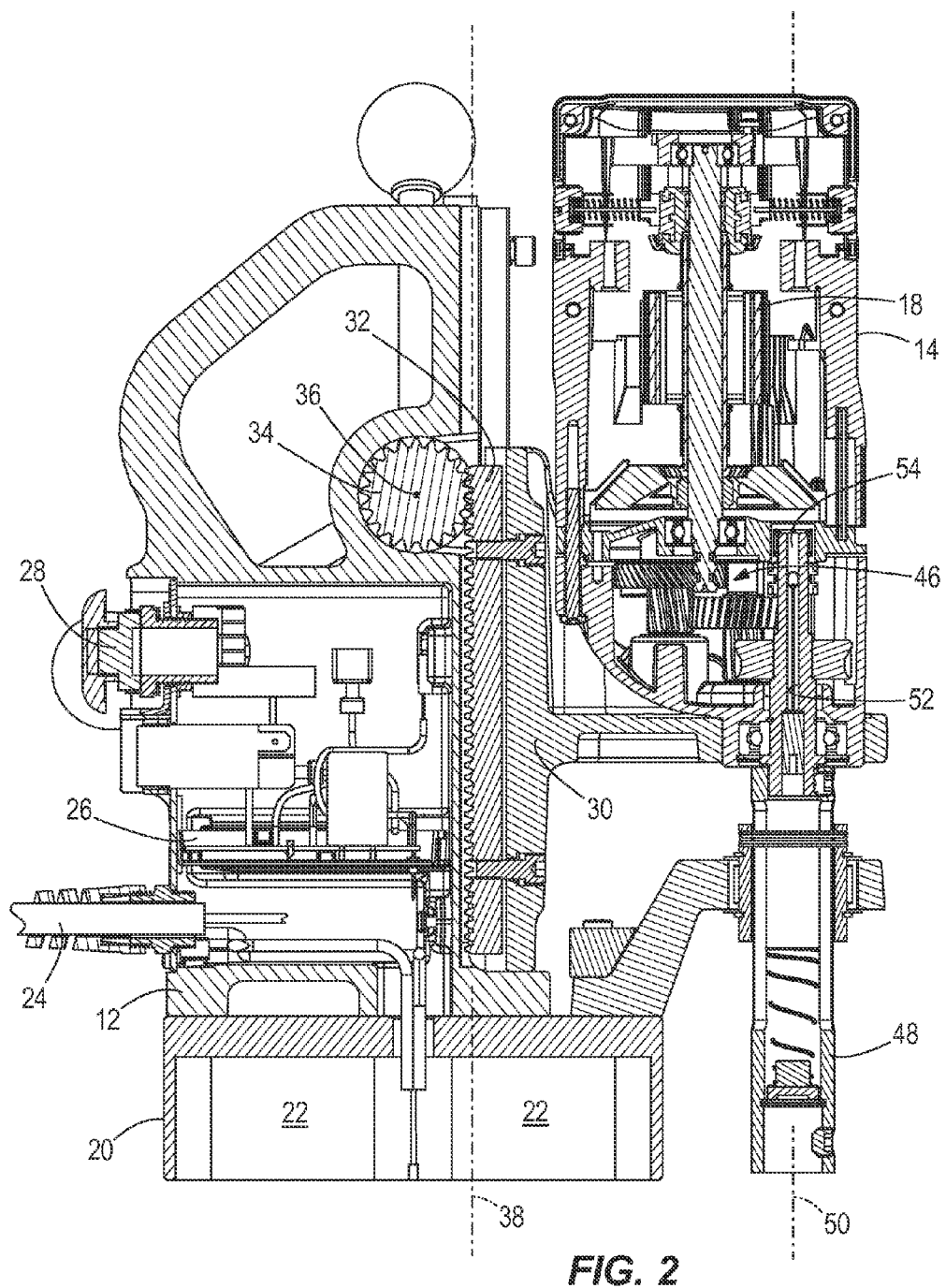
FIG. 2 is a sectional view of the magnetic drill press of FIG. 1, along section line 2-2.

FIG. 1 illustrates a drill press 10 according to one embodiment of the invention. The drill press 10 includes a main housing 12 and a motor housing 14. An electric motor 18 is housed within the motor housing 14 (FIG. 2). The drill press 10 further includes a magnetic base 20 for magnetically detachably coupling the drill press 10 and a ferromagnetic workpiece. Once magnetized, the magnetic base 20 secures the drill press 10 to the workpiece via a magnetic field generated by magnets 22 (FIG. 2).

Referring to FIG. 1, the drill press 10 includes an electrical cord 24 to connect to an AC power source, such as a wall outlet or a generator. The AC power source may be a conventional 120V or 240V power source. Referring to FIG. 2, the electric cord 24 is received in the main housing 12 and electrically coupled to a power module 26. A motor control switch 28 is coupled to main housing 12. The motor control switch 28 controls the supply of power to the electric motor 18 from the power module 26.

The motor housing 14 and the motor 18 are coupled to a motor carriage 30. A rack 32 is coupled to the motor carriage 30. A pinion 34 is rotatably coupled to the main housing 12 about a pinion axis 36. The pinion 34 engages the rack 32 for vertical actuation of the motor carriage 30 along a carriage axis 38. The pinion 34 is actuated by a user via a handle assembly 40 (FIG. 1). The handle assembly includes a handle hub 42. Three handle members 44 are coupled to the handle hub 42 in a radial arrangement.

Referring to FIG. 2, the motor 18 is coupled to a bit drive assembly 46. A bit 48 is selectively engageable with the bit drive assembly 46 for rotation about a bit axis 50. The bit axis 50 is substantially parallel to the carriage axis 38. Referring to FIG. 2, the bit drive assembly 46 defines a hollow passage 52 along the bit axis 50.

A laser 54 is disposed within the motor housing 14 for illumination along the bit axis 50. When used in combination with a hollow-centered bit, such as a hole saw, the laser 54 illuminates a workpiece along the bit axis 50. Thus, the laser 54 facilitates alignment of the bit axis 50 with a desired drilling axis. In some embodiments, the laser 54 may be electrically coupled to the power module 26, and selectively controlled by the motor control switch 28 or a separate switch. In other embodiments, the laser 54 may be powered by a separate power supply, such as a battery.

Figure 3:
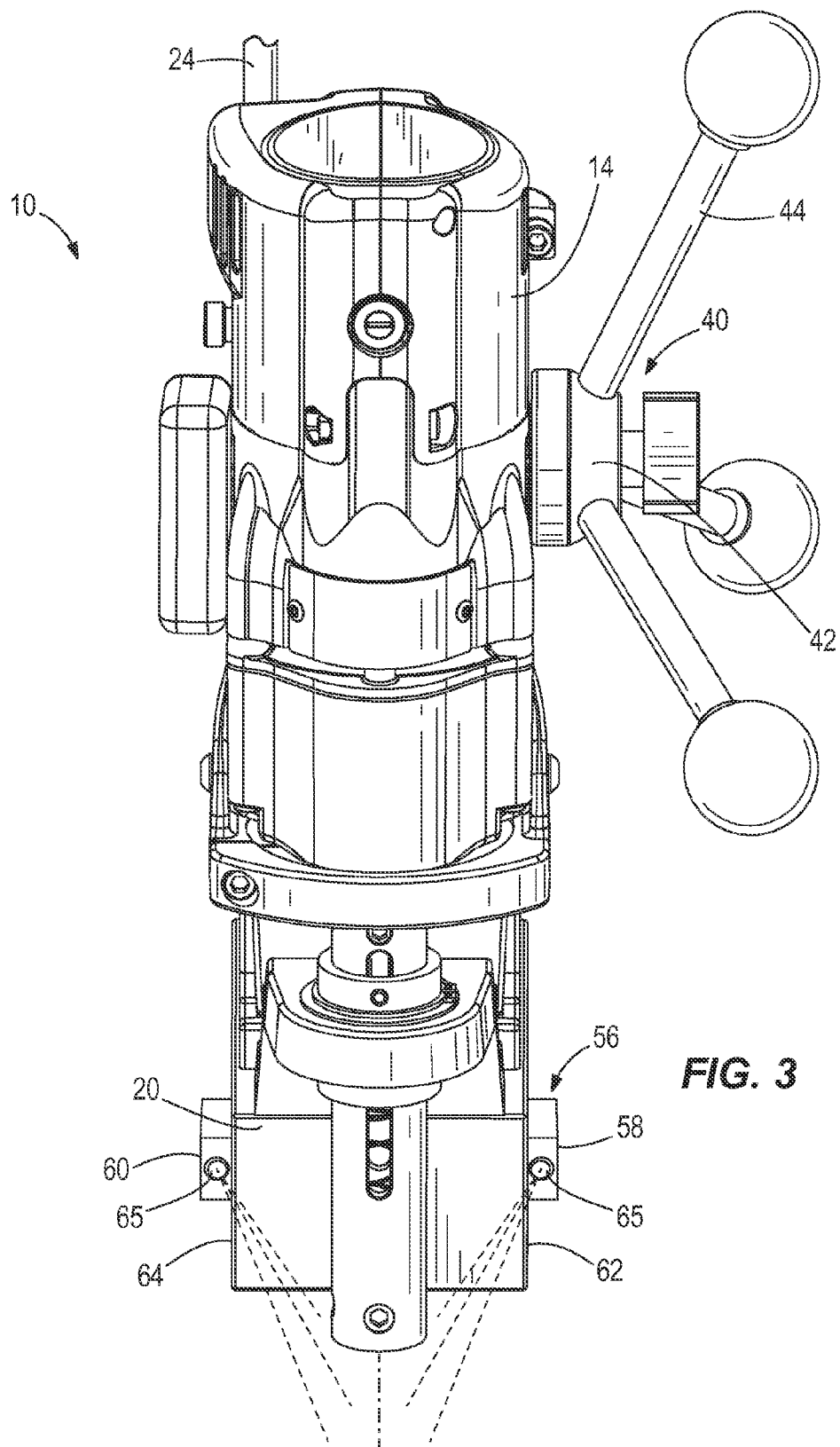
FIG. 3 is a front view of the drill press of FIG. 1.

Referring to FIGS. 1 and 3, the drill press 10 includes a workpiece illumination system 56. The workpiece illumination system 56 includes a first illuminator module 58 and, referring to FIG. 3, a second illuminator module 60. The first illuminator module 58 is coupled to a first side portion 62 of the magnetic base 20. The second illuminator module 60 is coupled to a second side portion 64 of the magnetic base 20. Each of the first illuminator module 58 and the second illuminator module 60 includes a light assembly 65, such as an incandescent bulb, or light emitting diode (LED). Each of the first illuminator module 58 and the second illuminator module 62 is aligned to illuminate a work area of the work piece. In some embodiments, the workpiece illumination system 56 may be electrically coupled to the power module 26, and selectively controlled by the motor control switch 28, or a separate switch. In other embodiments, the workpiece illumination system 56 may be powered by a separate power supply, such as a battery.

Figure 4:
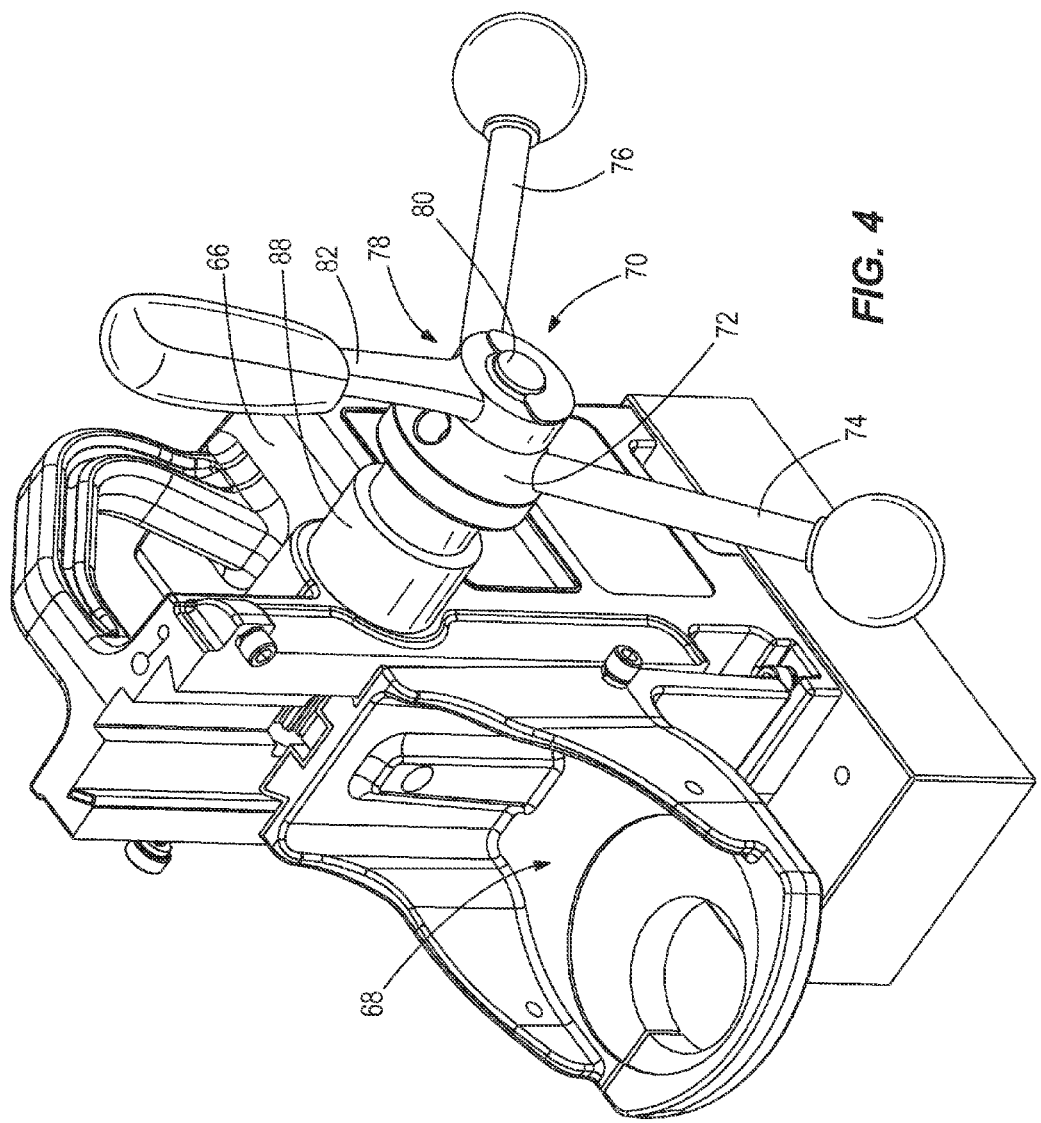
FIG. 4 is a perspective view of a housing and motor carriage assembly of a drill press according to another embodiment of the invention.

FIG. 4 illustrates a base housing 66 and motor carriage 68 according to another embodiment of the invention. In the embodiment of FIG. 4, a handle assembly 70 includes a handle hub 72. A first handle member 74 and a second handle member 76 are coupled to the handle hub 72. A ratchet assembly 78 is additionally coupled to the handle hub 72. The ratchet assembly 78 includes a ratchet head portion 80 and a ratchet handle portion 82 coupled to the ratchet head portion 80. The ratchet assembly 78 allows a user to actuate the handle hub 72 with reciprocating motion of the ratchet handle portion 82.

Figure 5:
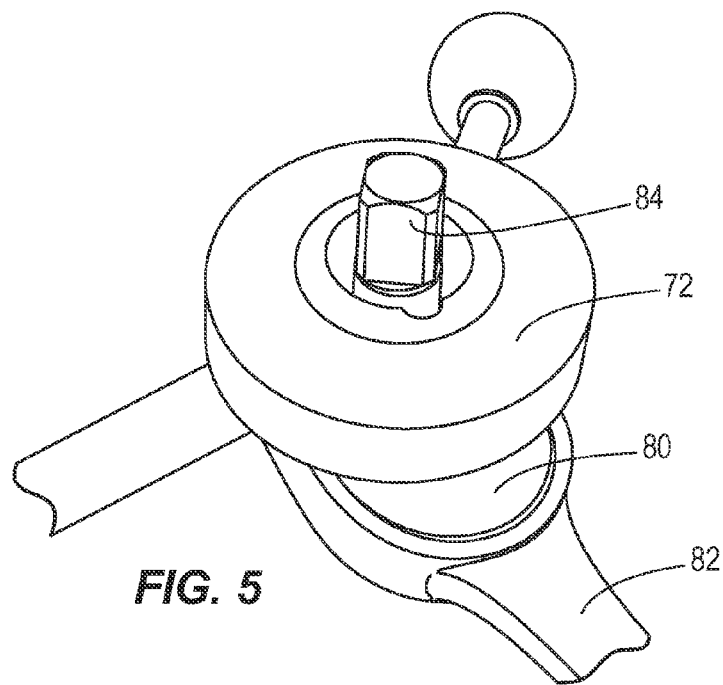
FIG. 5 is a perspective view of a handle ratchet assembly of the housing and motor carriage assembly of FIG. 4.
Figure 6:
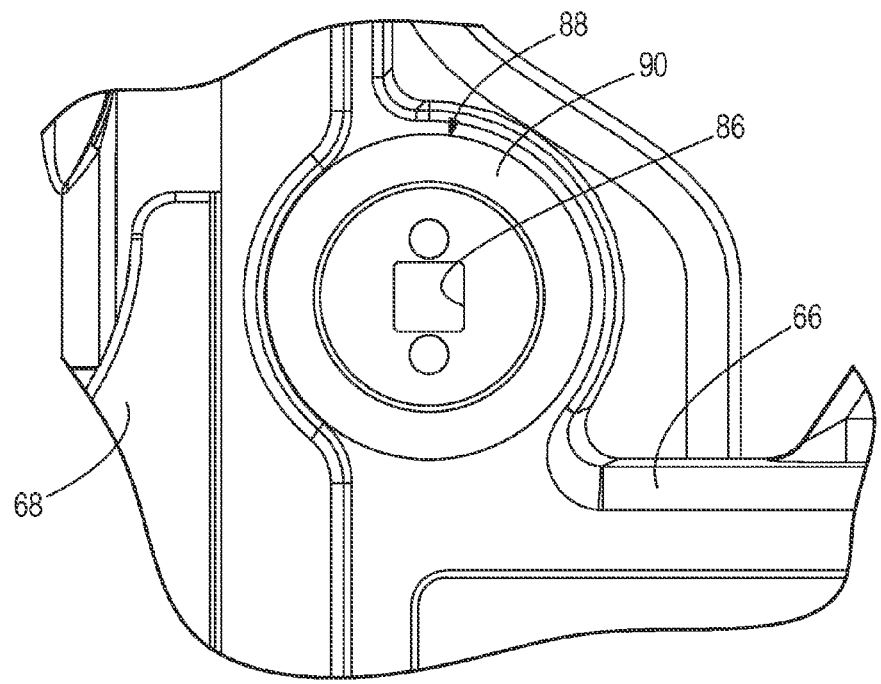
FIG. 6 is a side view of a spindle assembly installed in the housing and motor carriage assembly of FIG. 4.

Referring to FIG. 5, the handle hub 72 includes a drive member 84. The square drive member 84 is configured to be received by a square drive socket 86 of a spindle assembly 88 (FIG. 6). Therefore, the handle assembly 70 may be removably coupled to the spindle assembly 88 without the use of tools. The spindle assembly 88 acts as an interface between the handle assembly 70 and the base housing pinion, such as the pinion 34 of FIG. 2.

Figure 7:
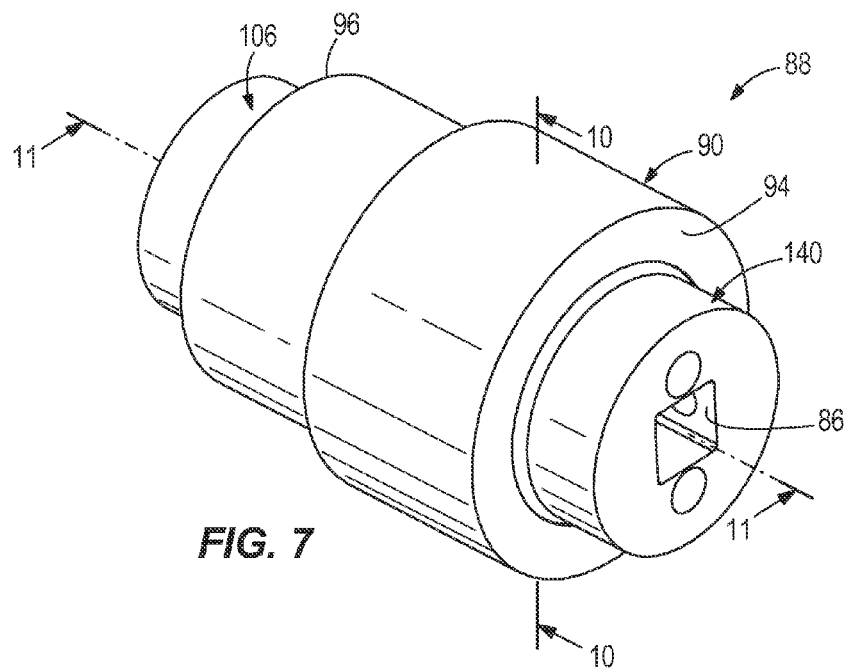
FIG. 7 is a perspective view of the spindle assembly of FIG. 6.
Figure 9:
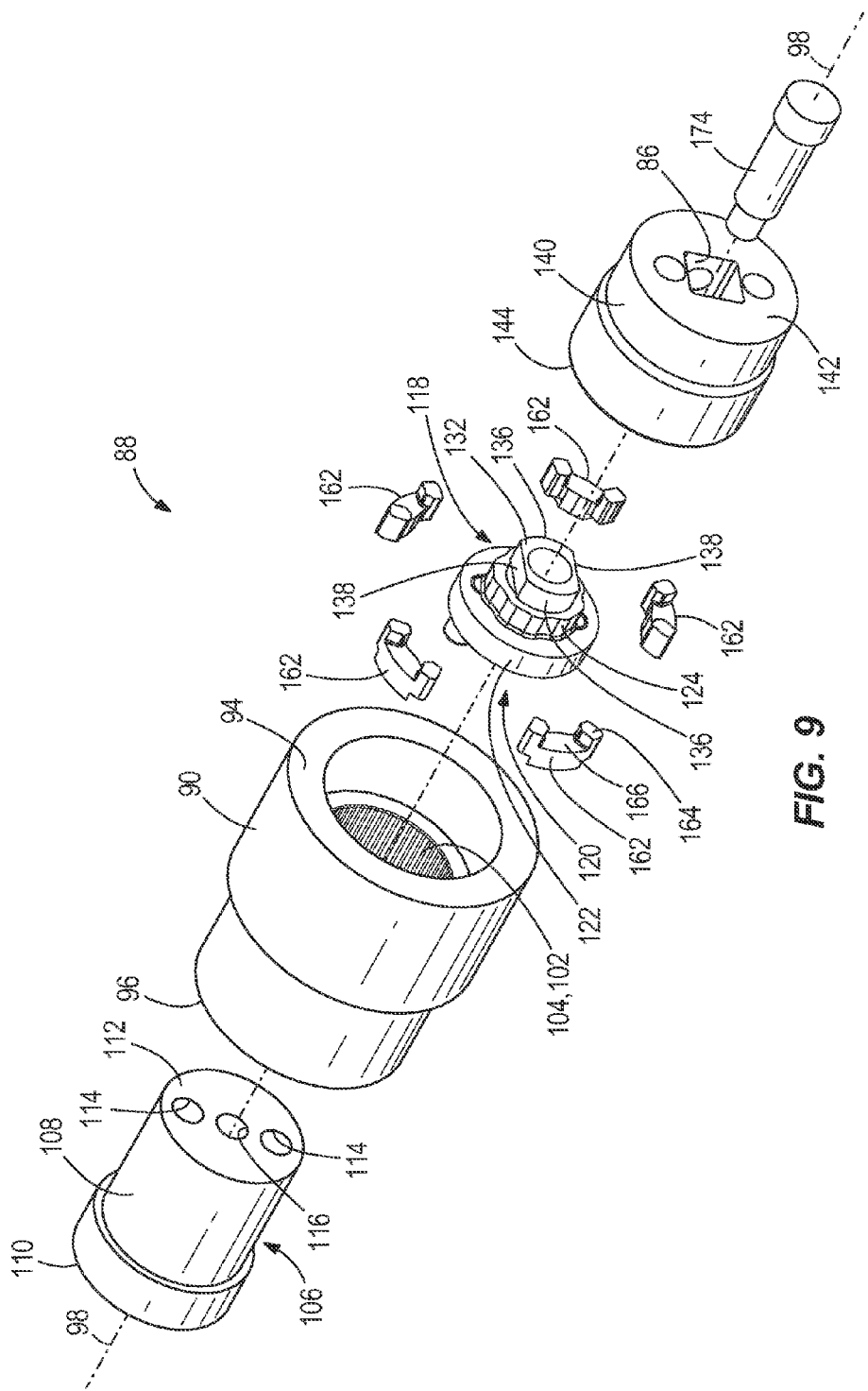
FIG. 9 is an exploded view of the spindle assembly of FIG. 7.
Figure 11:
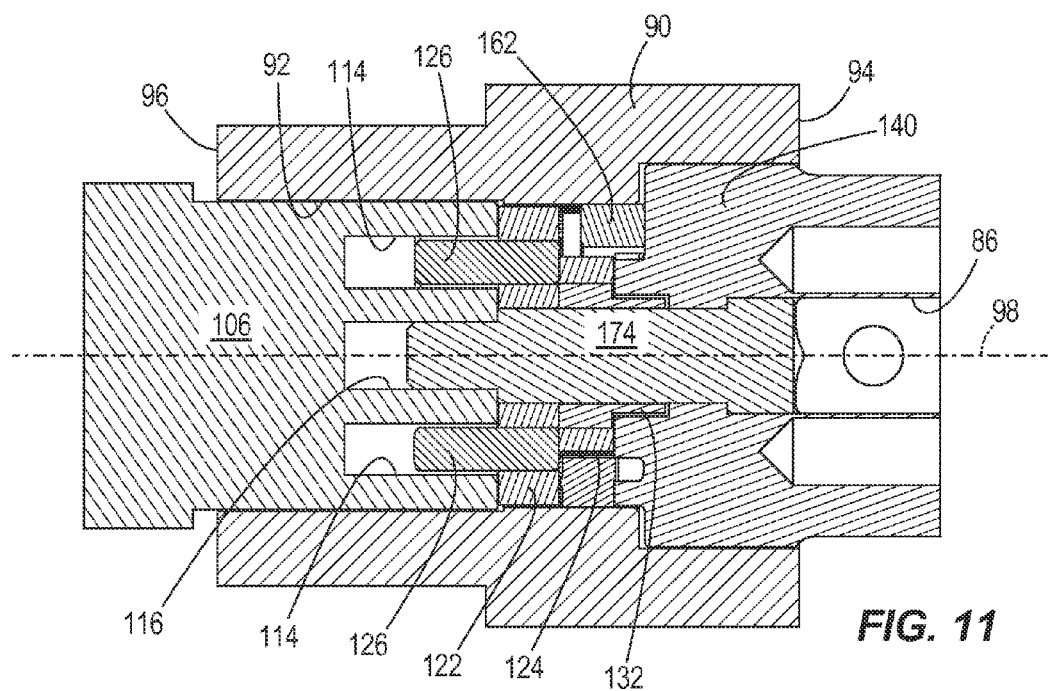
FIG. 11 is a section view of the spindle assembly taken along section line 11-11 of FIG. 7.

Referring to FIG. 7, the spindle assembly 88 includes a collar 90. The collar 90 is fixedly coupled to the base housing 66, as illustrated in FIG. 6. Referring to FIG. 11, the collar 90 has a hollow center 92 extending between a handle end 94 and a pinion end 96 along a spindle axis 98. Referring to FIG. 9, the collar 90 defines a toothed portion 102 between the handle end 94 and the pinion end 96. The toothed portion 102 includes axially-extending, radially projecting, tooth members 104.

An inner spindle 106 is rotatably coupled to the collar 90. The inner spindle 106 includes a substantially cylindrical body 108, extending from a pinion end 110 to a hub end 112 along the pinion axis 98. The pinion end 110 is coupled to the pinion 34 (FIG. 2) for rotation of the pinion 34 about the pinion axis 36 and, thereby, to actuate the rack 32 of the motor carriage 30. Referring to FIG. 9, the hub end 112 of the inner spindle 106 defines two engagement recesses 114 and a threaded aperture 116.

Figure 10:
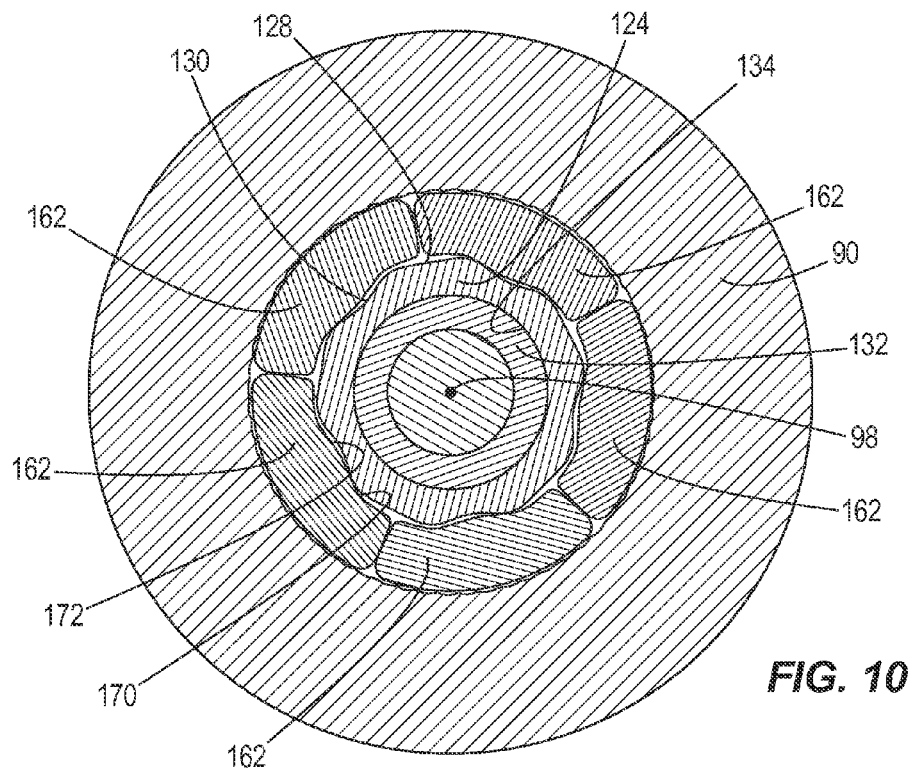
FIG. 10 is a section view of the spindle assembly taken along section line 10-10 of FIG. 7.

A spindle hub assembly 118 includes a hub body 120. The hub body 120 includes a cylindrical portion 122 and a dog actuator portion 124. Referring to FIG. 11, the cylindrical portion 122 receives two drive pins 126 for driving engagement with the engagement recesses 114 of the inner spindle 106. Referring to FIG. 10, the dog actuator portion 124 defines five radial lobes 128 and five radial recesses 130, with the radial lobes 128 and radial recesses 130 alternating circumferentially about the spindle axis 98. Referring to FIG. 9, the dog actuator portion 124 also receives a torque transfer link 132. More specifically, the torque transfer link 132 is fixedly received in a circular recess 134 defined in the dog actuator portion 124. The torque transfer link 132 defines a pair of opposing convex surfaces 136, separated by a pair of flat, mutually parallel surfaces 138.

Figure 8:
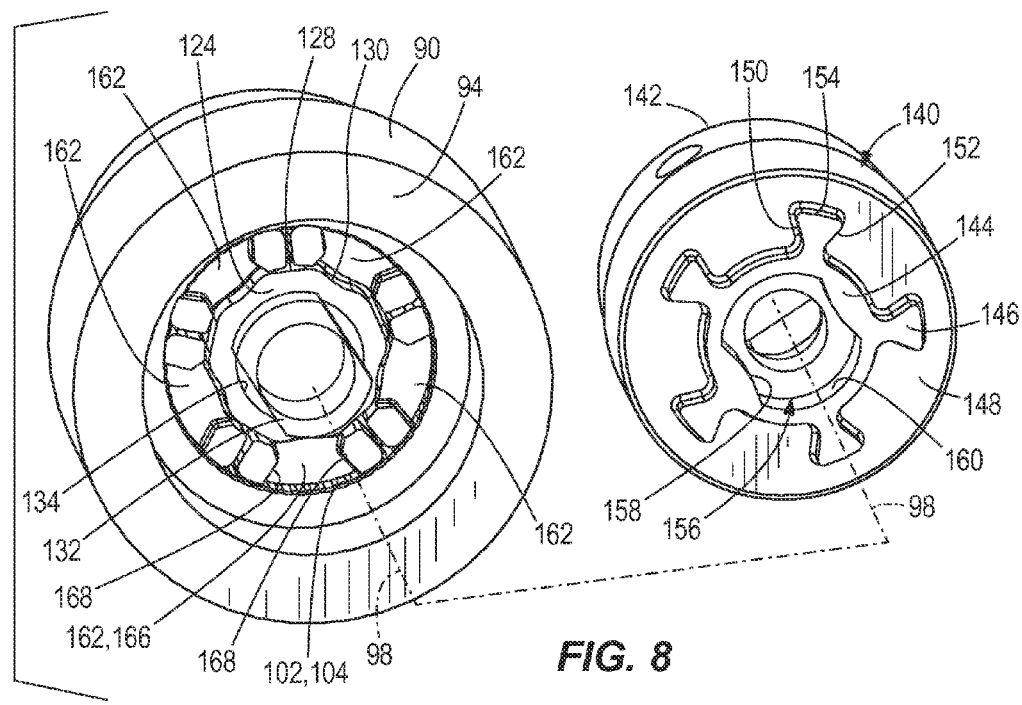
FIG. 8 is a partially exploded view of the spindle assembly of FIG. 7.

Referring to FIGS. 7 and 10, an outer spindle 140 is rotatably coupled to the collar 90 at the handle end 94. The outer spindle 140 defines, on a first end 142, the square drive socket 86 to which the handle assembly 70 is selectively coupled. Referring to FIG. 8, a dog carrier hub 144 and five dog lugs 146 extend axially from the second end 148 of the outer spindle 140. Each of the dog carrier lugs 146 extends radially from a substantially circular dog hub 148. In the illustrated embodiment, five dog carrier lugs 146 are circumferentially evenly arranged about the spindle axis 98. Each dog carrier lug 146 defines a first alignment surface 150, a second alignment surface 152, and a circumferential surface 154.

The dog hub 148 defines a torque transfer recess 156. The torque transfer recess 156 includes a pair of opposing convex walls 158, separated by a pair of opposing concave wall 160. The torque transfer recess 156 is configured to rotatably receive the torque transfer link 132. More specifically, the convex surfaces 160 of the torque transfer recess 156 allow for a small degree of relative rotation (e.g., less than ten degrees) between the outer spindle 140 and the torque transfer link 132.

Referring to FIG. 9, five dog members 162 are arranged circumferentially about the pinion axis 98, between the outer spindle 140 and the hub body 120. An outer end 164 of each dog member 162 defines a groove 166 configured to receive the dog carrier lugs 146. Referring to FIG. 8, non-radial side walls 168 of the grooves 166 are configured to be engaged by the first alignment surface 150 or second alignment surface 152 of the dog carrier lugs 146. Referring to FIG. 10, an inner radial surface 170 of each dog member 162 defines a dog cam lobe 172.

Referring to FIGS. 9 and 11, the spindle assembly 88 is assembled with a shoulder bolt 174. More specifically, the shoulder bolt 174 extends through the outer spindle 140 and the hub assembly 118 to threadedly engage the threaded recess 116 of the inner spindle 106. The dog members 162 float between the outer spindle 140, the hub assembly 118, and the hollow center 92 of the collar 90.

When the handle assembly 70 (FIG. 4) is actuated by a user to, for example, drive a bit into a work piece, the drive member 84 (FIG. 5) transmits torque to the outer spindle 140 at the square drive socket 86 (FIG. 7). After a small degree of rotation (e.g., less than 10 degrees), torque applied to the outer spindle is transmitted to torque transfer link 132 via the torque transfer recess 156 of the outer spindle (FIG. 8). Referring to FIG. 11, from the torque transfer link 132, torque is transmitted through the cylindrical portion 122. From the cylindrical portion 122, the torque is transferred to the inner spindle 106 via the drive pins 126. Simultaneously, and with reference to FIG. 8, the first alignment surfaces 150 or second alignment surfaces 152 (depending upon a direction of rotation about the spindle axis 98) of the dog carrier lugs 146 engage the non-radial side walls 168 of the dog members 162 and biases the dog members 162 radially inward, thereby substantially preventing the dog members 162 from binding engagement with the teeth 104 (FIG. 9) of the collar 90.

When a user releases the handle assembly 70 (FIG. 4), the dog carrier lugs 146 no longer force the dog members 162 in an inwardly radial direction. Furthermore, any torque applied to the inner spindle 106 (e.g., from the weight of the motor carriage 68) causes the hub assembly 118 to rotate relative to the outer spindle 140, until the torque transfer link 132 reengages the torque transfer recess 156 (e.g., less than ten degrees of rotation). Referring to FIG. 10, the rotation of the hub assembly 118 causes the radial lobes 128 of the dog actuator portion 124 to engage the dog cam lobes 172, thereby forcing the dog members 162 radially outward, and into engagement with the teeth 104 of the collar 90. Engagement of the dogs 162 with the collar 90 substantially inhibits further rotation of the inner spindle 106, effectively causing "spindle lock." In order to disengage the spindle lock condition, a user merely applies torque through the outer spindle 140 (via the handle assembly 70), thereby disengaging the dog members 162 from the teeth 104 of the collar 90 by applying an inward radial force from the dog carrier lugs 146. This substantially automatic spindle lock operation is especially advantageous when using the ratchet assembly 78, as the spindle assembly 88 maintains its position while cycling the ratchet assembly 78.

Figure 12:
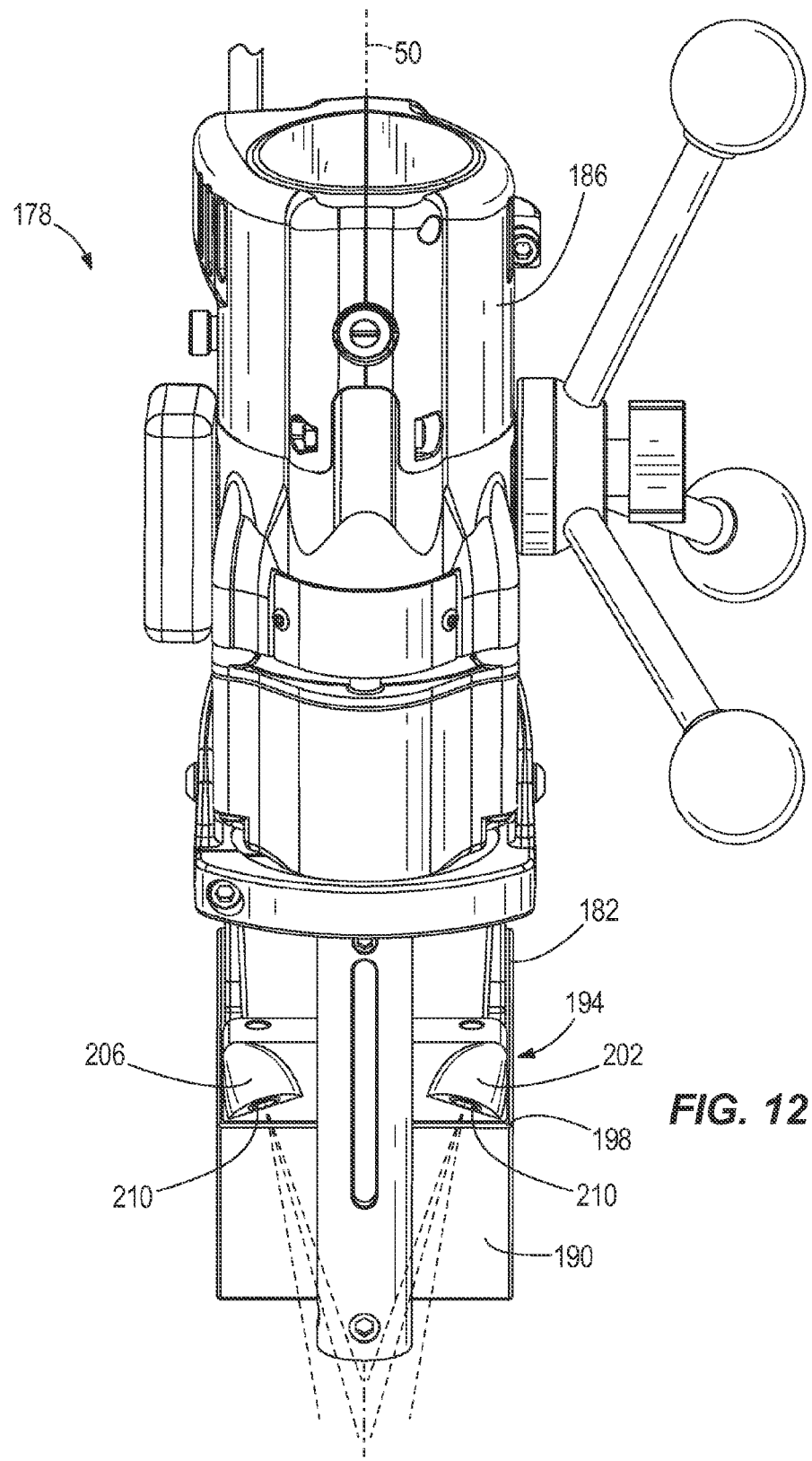
FIG. 12 is a front view of a magnetic drill press according to another embodiment of the invention.

FIG. 12 illustrates another embodiment of a drill press 178. The drill press has substantial similarities to the drill press 10 described with respect to FIGS. 1-11, and only those aspects that differ from the embodiments of FIGS. 1-11 will be described herein.

The drill press 178 includes a base housing 182, and a motor housing 186. Referring to FIG. 12, the drill press 178 further includes a magnetic base 190 for magnetically detachably coupling the drill press 178 and a ferromagnetic workpiece.

Referring to FIG. 12, the drill press 178 includes a workpiece illumination system 194. The workpiece illumination system 194 is coupled to a top portion 198 of the magnetic base 190. The workpiece illumination system 194 includes a first illuminator module 202 and a second illuminator module 206. Each of the first illuminator module 202 and the second illuminator module 206 includes a light assembly 210, such as an incandescent bulb, or light emitting diode (LED). Each of the first illuminator module 202 and the second illuminator module 206 is aligned to illuminate a work area of the work piece. In the illustrated embodiment, the first illuminator 202 and the second illuminator 206 are aligned to illuminate a work area along the bit axis 50.

Figure 13:
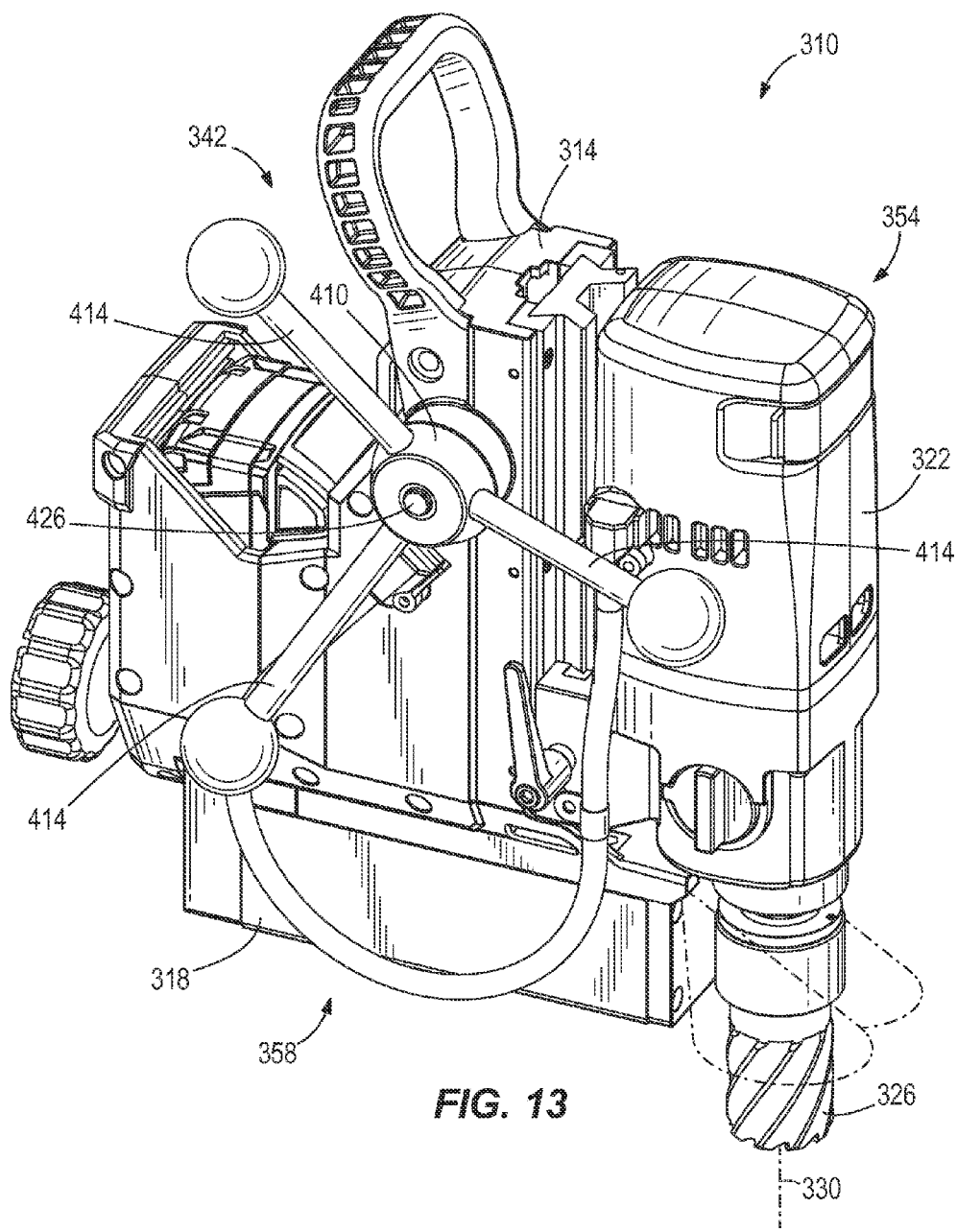
FIG. 13 is a perspective view of a magnetic drill press, according to another embodiment of the invention, with a handle assembly positioned on one side of a housing.
Figure 14:
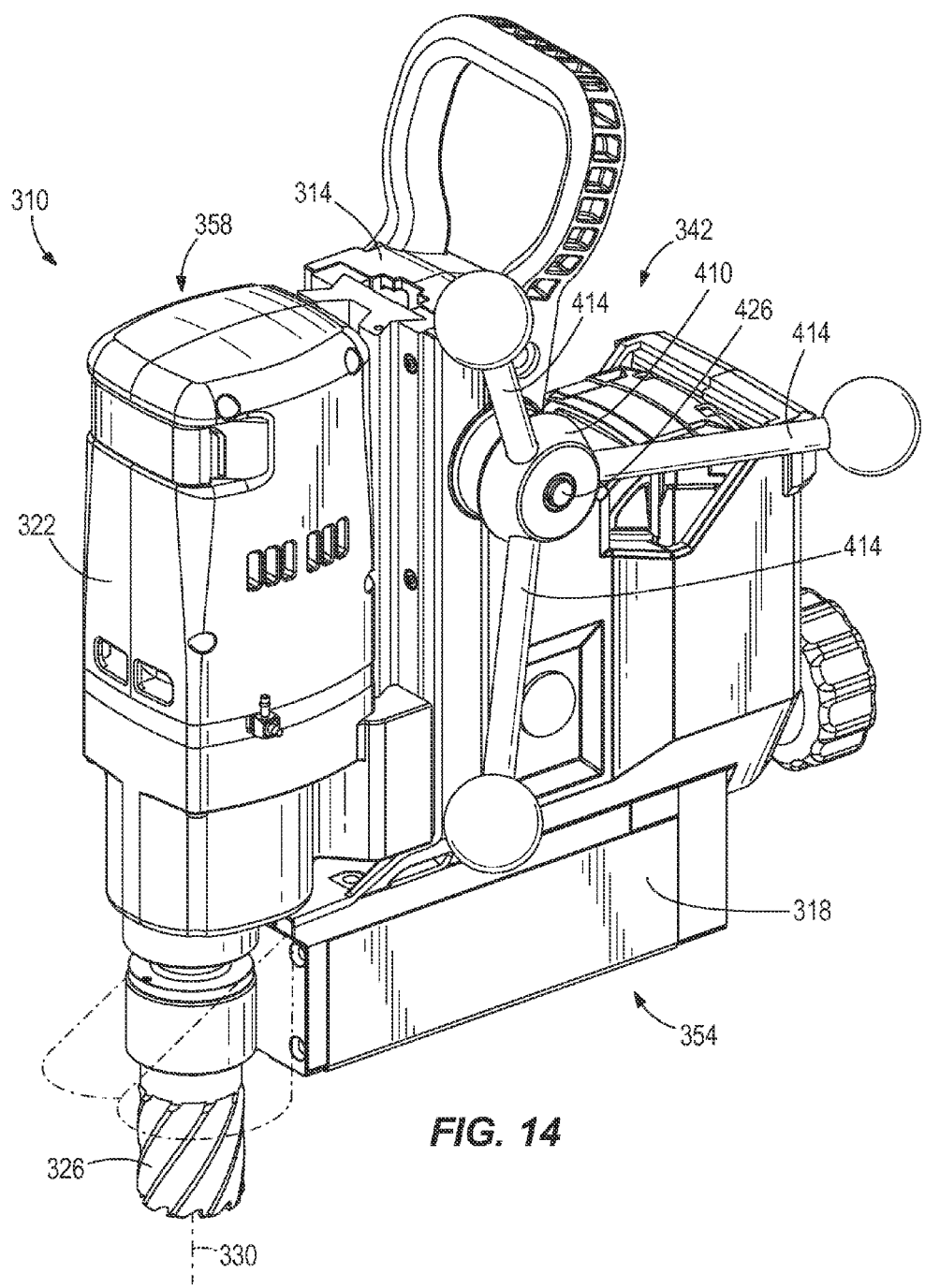
FIG. 14 is a perspective view of the magnetic drill press of FIG. 13 with the handle assembly positioned on another side of the housing.
Figure 15:
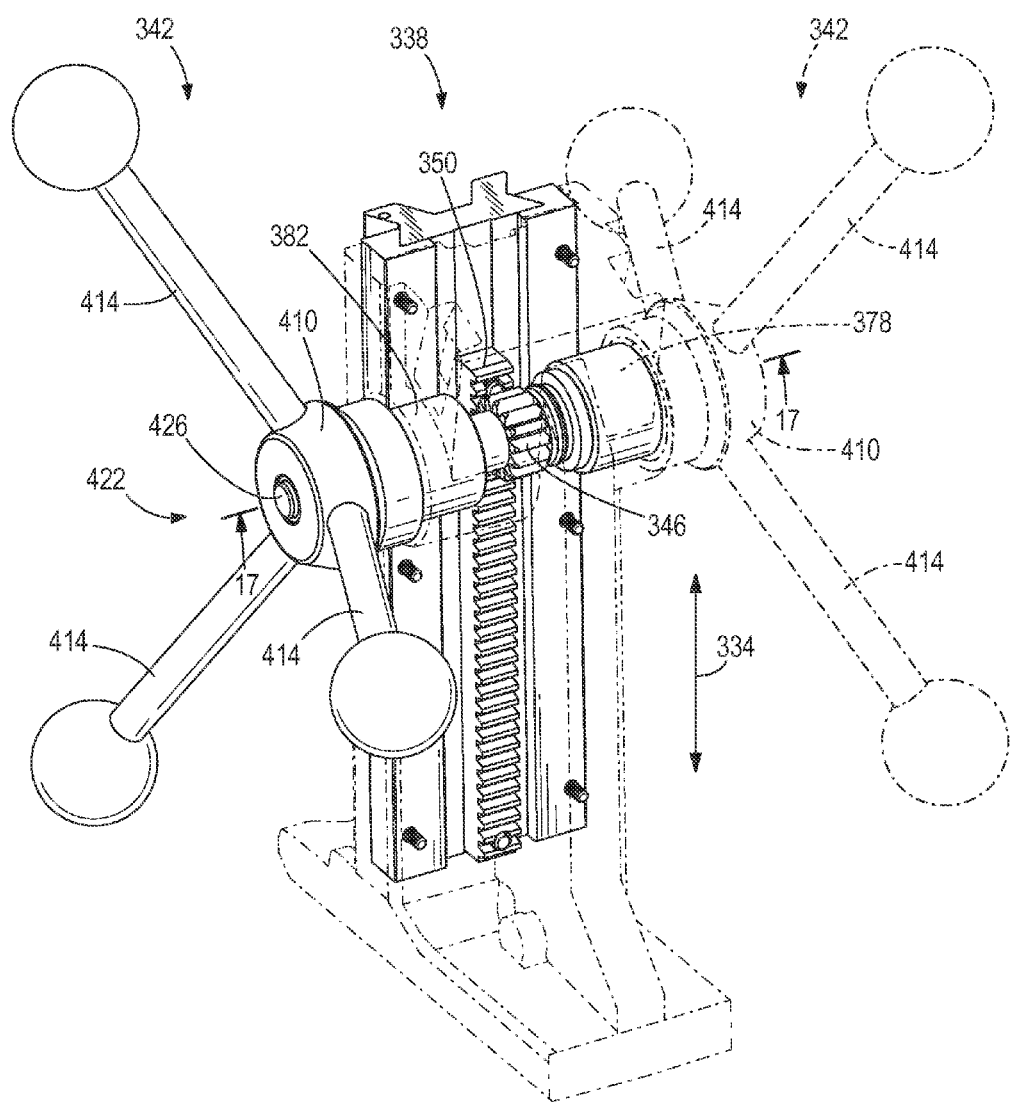
FIG. 15 is a perspective view of a portion of the magnetic drill press of FIG. 13 including a spindle assembly illustrated with two handle assemblies.

With reference to FIGS. 13-15, a magnetic drill press 310 in accordance with another embodiment of the invention is illustrated. The magnetic drill press 310 includes a main housing 314 and a base 318 coupled to the main housing 314. The base 318 selectively magnetically latches to a ferromagnetic workpiece. A drill unit 322 is supported by the main housing 314 and includes a working tool 326 driven about a rotational axis 330. The drill unit 322 is coupled to the main housing 314 for relative movement therewith along a direction 334 (FIG. 15) of the rotational axis 330 of the drill unit 322 (i.e., the drill unit 322 moves in a direction parallel to the rotational axis 330).

Figure 16:
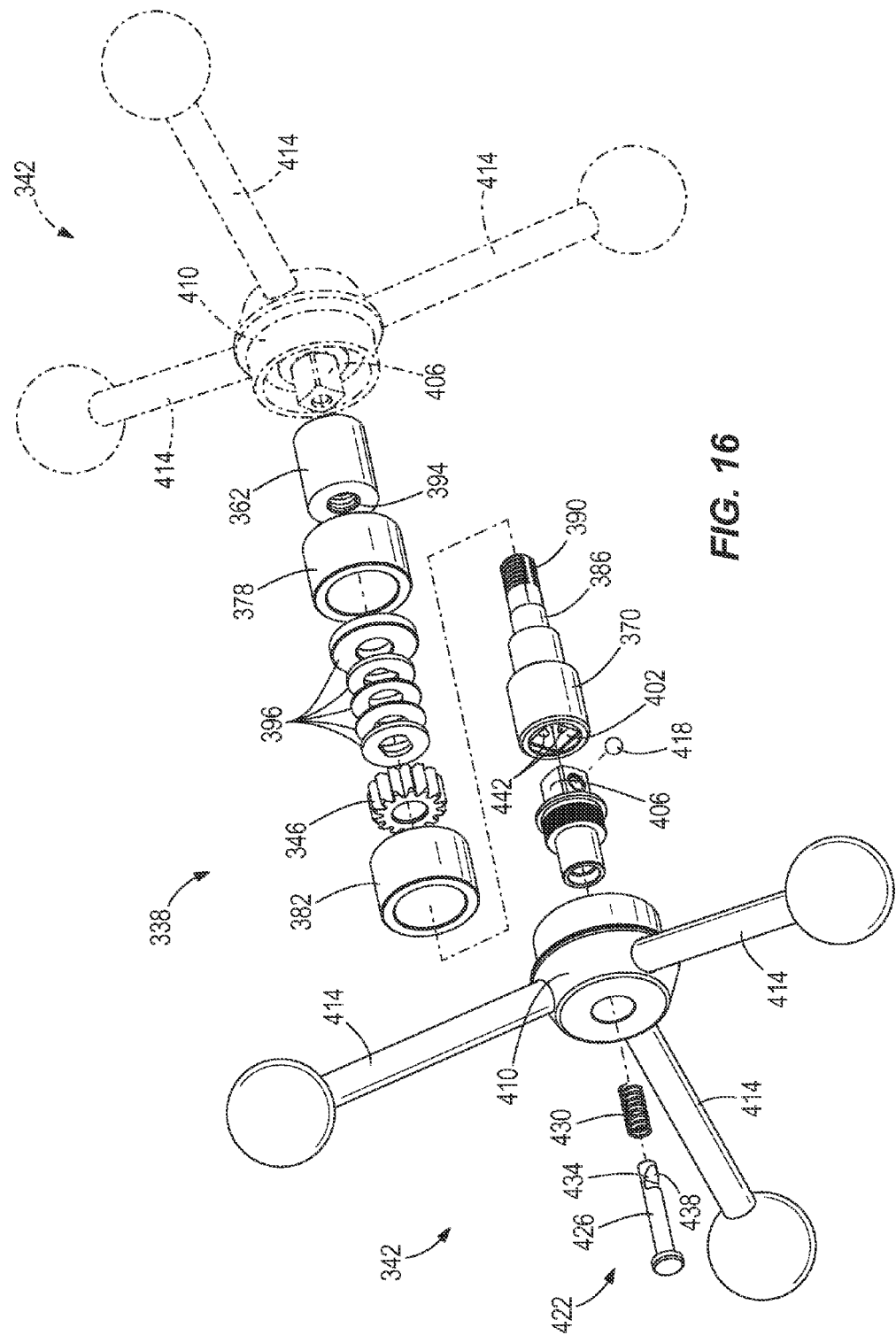
FIG. 16 is an exploded perspective view of the spindle assembly and the handle assemblies of FIG. 15.
Figure 17:
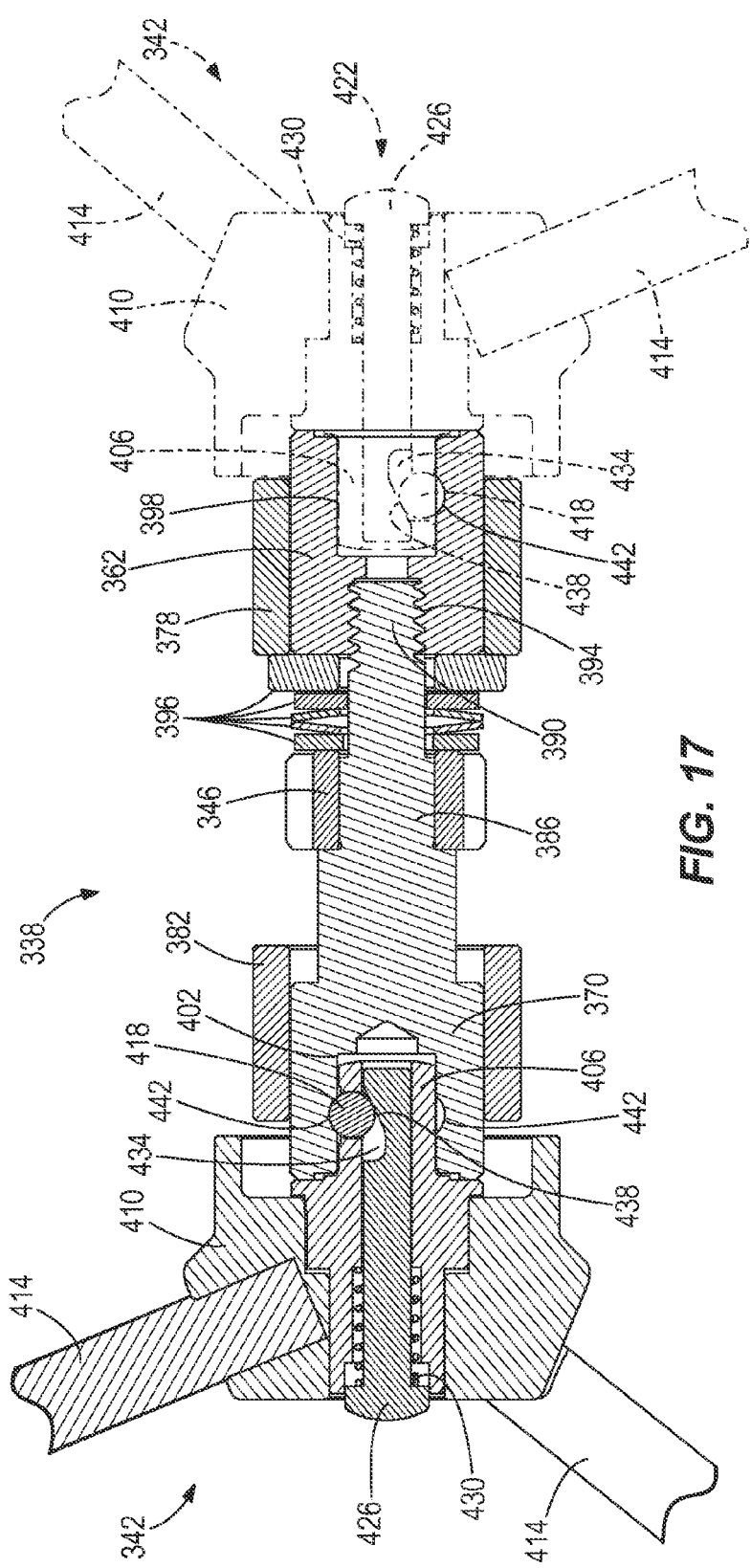
FIG. 17 is cross-sectional view of the spindle assembly and the handle assemblies of FIG. 15 taken along line 17-17 in FIG. 15.

In addition, and with continued reference to FIG. 15, the magnetic drill press 310 includes a spindle assembly 338 operable to selectively position the drill unit 322 relative to the main housing 314, and a handle assembly 342 for driving the spindle assembly 338. The spindle assembly 338 includes a pinion 346 that is drivingly engaged with a rack 350 positioned within the main housing 314. The rack 350, in turn, is attached to the drill unit 322. As described in further detail below, the handle assembly 342 is removably coupled to either end of the spindle assembly 338 without the use of tools. And, the handle assembly 342 can be interchangeably coupled to the spindle assembly 338 on either a first side 354 of the main housing 314 (FIG. 14) or a second side 358 of the main housing 314 (FIG. 13). In this manner, a user may select on which of the sides 354, 358 to attach the handle assembly 342 depending on user preference or work environment constraints. With reference to FIGS. 15-17, the handle assembly 342 is shown positioned on the second side 358 of the main housing 314. However, a second instance of the handle assembly 342 is shown in phantom on the first side 354 of the main housing 314 to illustrate its alternative position.

With reference to FIGS. 16 and 17, the spindle assembly 338 includes a first spindle 362 proximate to and accessible from the first side 354 of the main housing 314 and a second spindle 370 proximate to and accessible from the second side 358 of the main housing 314. The spindle assembly 338 includes a first bushing 378 positioned around the first spindle 362 and a second bushing 382 positioned around the second spindle 370. The bushings 378, 382 rotatably support the spindles 362, 370, respectively, and are mounted within the main housing 314.

With continued reference to FIGS. 16 and 17, the second spindle 370 includes a threaded shank 390 received within a threaded bore 394 in the first spindle 362 to thereby unitize the spindles 362, 370 for co-rotation. Alternatively, the spindles 362, 370 may be non-rotatably and axially coupled in different manners. The second spindle 370 also includes a cylindrical portion 386 upon which the pinion 346 is supported. A plurality of washers 396 are positioned around the cylindrical portion 386 between the first spindle 362 and the pinion 346. In the illustrated embodiment, at least one of the plurality of washers 396 is a Belleville washer that exerts an axial preload on the pinion 346 to cause the pinion 346 to co-rotate with the second spindle 370 in response to a torque input to either of the spindles 362, 370. The axial preload on the pinion 346, however, also permits the pinion 346 to slip relative to the spindles 362, 370 should the drill unit 322 encounter higher than usual resistance when drilling a workpiece.

The first spindle 362 defines a first non-cylindrical drive socket 398 (FIG. 17) accessible from the first side 354 of the main housing 314 and the second spindle 370 defines a second non-cylindrical drive socket 402 (see also FIG. 16) accessible from the second side 358 of the main housing 314. The drive sockets 398, 402 are each operable to receive a corresponding-shaped drive member 406 of the handle assembly 342. In the illustrated embodiment of the drill press 310, the drive sockets 398, 402 and the drive member 406 each have a corresponding square cross-sectional shape. Alternatively, the drive sockets 398, 402 and the drive member 406 may be configured having different corresponding non-cylindrical shapes.

The handle assembly 342 also includes a handle hub 410 from which the drive member 406 extends and levers 414 extending from the handle hub 410 in a canted or oblique direction. The handle assembly 342 further includes quick-release mechanism 422 for selectively locking the handle assembly 342 to the spindle assembly 338. In the illustrated embodiment, the quick-release mechanism includes a ball detent 418 in one of the faces of the drive member 406 and a plunger 426 coaxial with the hub 410 and drive member 406 for biasing the ball detent 418 toward a position in which at least a portion of the ball detent 418 protrudes from the face of the drive member 406 in which it is located (i.e., an extended position). In the illustrated embodiment, the plunger 426 is biased by a compression spring 430. The plunger 426 includes a notch 434 (FIG. 17) into which the ball detent 418 is received when the plunger 426 is depressed against the spring 430. When the plunger 426 is released, a ramp surface 438 on the plunger 426 adjacent the slot 434 displaces the ball detent 418 radially outward, causing a portion of the ball detent 418 to protrude from the drive member 406 and engage a corresponding detent recess 442 in the drive sockets 398, 402 (FIGS. 16 and 17), thereby axially retaining the handle assembly 342 to the spindle assembly 338.

In operation, a user automatically couples the handle assembly 342 to the spindle assembly 338 by inserting the square drive 406 into either the first drive socket 398 or the second drive socket 402. Once inserted, the ball detent 418 axially retains the handle assembly 342 to the spindle assembly 338. A user then rotates the handle assembly 342 to reposition the drill unit 322 with respect to the main housing 314. To remove the handle assembly 342 for storage or for repositioning to the other side of the main housing 314, a user depresses the plunger 426 against the bias of the spring 430, moving the ball detent 418 into the notch 434 (i.e., a retracted position). With the ball detent 418 in the notch 434, no portion of the ball detent 418 protrudes from the drive member 406 for engaging the detent recesses 442, thereby permitting removal of the handle assembly 342 from either the first drive socket 398 or the second drive socket 402. To reattach the handle assembly 342 to either side of the spindle assembly 338, the user needs only to push the drive member 406 into one of the drive sockets 398, 402. Interference between the ball detent 418 and the drive sockets 398, 402 displaces the ball detent 418 inward. A component of the ball detent 418 displacement is redirected axially by the ramp surface 438, against the bias of the spring 430, causing the plunger 426 to automatically retract into the hub 410 during insertion of the drive member 406 into one of the drive sockets 398, 402. Upon receipt of the ball detent 418 into one of the detent recesses 442 in the drive sockets 398, 402, the handle assembly 342 is again locked to the spindle assembly 338

Various features and advantages of the invention are set forth in the following claims.

What is claimed is:

1. A magnetic drill press comprising:
   a main housing;
   a base coupled to the main housing for selectively magnetically latching to a ferromagnetic workpiece;
   a drill unit supported by the main housing for relative movement therewith in a direction of a rotational axis of the drill unit;
   a spindle assembly operable to selectively position the drill unit relative to the main housing, wherein the spindle assembly includes
      a first spindle proximate a first side of the main housing;
      a second spindle proximate a second side of the main housing, the second spindle having a cylindrical portion; and
      a pinion supported upon the cylindrical portion and wherein the first and second spindles are rotatable relative to the pinion; and
   a handle assembly, removably coupled to the spindle assembly without the use of tools, for driving the spindle assembly.

2. The magnetic drill press of claim 1, wherein the handle assembly is automatically locked to the spindle assembly in response to engagement of the handle assembly and the spindle assembly.

3. The magnetic drill press of claim 1, wherein the handle assembly further includes a quick-release mechanism, and wherein the handle assembly is removable from the spindle assembly by a user actuating the quick-release mechanism.

4. The magnetic drill press of claim 3, wherein the handle assembly includes a drive member engageable with the spindle assembly, and wherein the quick-release mechanism includes a ball detent movable between an extended position, in which at least a portion of the ball detent protrudes from the drive member, and a retracted position, in which the ball detent is retracted within the drive member.

5. The magnetic drill press of claim 4, wherein the quick-release mechanism includes a plunger engageable with the ball detent and a spring biasing the ball detent, through the plunger, toward the extended position.

6. The magnetic drill press of claim 5, wherein the plunger includes a notch into which the ball detent is receivable in the refracted position when the plunger is depressed against the spring.

7. The magnetic drill press of claim 5, wherein the plunger is coaxial with the drive member.

8. The magnetic drill press of claim 1, wherein the handle assembly includes a hub, a square-shaped drive member extending from the hub, and a lever extending from the hub.

9. The magnetic drill press of claim 1, wherein the handle assembly is removably coupled to the first spindle and the second spindle without the use of tools.

10. The magnetic drill press of claim 1, wherein the first and second spindles are coupled for co-rotation by a threaded connection.

11. The magnetic drill press of claim 1, wherein the first spindle includes a first drive socket and the second spindle includes a second drive socket, and wherein the first drive socket and the second drive socket selectively receive therein a drive member of the handle assembly.

12. The magnetic drill press of claim 1, wherein the magnetic drill press further includes a rack coupled to the drill unit, and wherein the pinion is engaged with the rack for driving the rack and the drill unit in the direction of the rotational axis in response to rotation of the pinion.

13. The magnetic drill press of claim 1, wherein the handle assembly includes a ratchet assembly having a ratchet head coupled to a handle hub, and a ratchet handle coupled to the ratchet head for actuating the spindle assembly by reciprocating motion of the ratchet handle.

14. The magnetic drill press of claim 1, wherein the spindle assembly includes
   a collar having an inside surface;
   an outer spindle to which the handle assembly is drivingly engaged;
   an inner spindle drivingly coupled to the drill unit;
   a spindle hub body acting as an interface between the outer spindle and the inner spindle; and
   a dog member engaging the inside surface of the collar to substantially inhibit rotation of the spindle hub body, the dog member disengaged from the inside surface upon user actuation of the handle assembly to allow rotation of the spindle hub body to thereby move the drill unit with respect to the main housing.

15. The magnetic drill press of claim 14, wherein the dog member is actuated by the spindle hub body.

16. The magnetic drill press of claim 14, wherein the inside surface of the collar defines a plurality of teeth to which the dog member is engaged.

17. The magnetic drill press of claim 14, wherein the outer spindle includes a drive socket, and wherein the drive socket receives therein a drive member of the handle assembly.

18. The magnetic drill press of claim 1, wherein the spindle assembly further includes a biasing member positioned around the second spindle and positioned between the pinion and the first spindle, and wherein the biasing member imparts a force on the pinion to create friction between the pinion and the second spindle to cause the pinion to co-rotate with the first and second spindles.

19. The magnetic drill press of claim 18, wherein the first and second spindles are rotatable relative to the pinion in response to the friction between the pinion and the second spindle being overcome.

20. The magnetic drill press of claim 18, wherein the biasing member is a Belleville washer.

\* \* \* \* \*